(12) United States Patent
Elshafie et al.

(10) Patent No.: US 11,616,604 B2
(45) Date of Patent: Mar. 28, 2023

(54) REPLACING BROKEN UPLINK REPETITIONS

(71) Applicant: QUALCOMM Incorporated, San Diego, CA (US)

(72) Inventors: Ahmed Elshafie, San Diego, CA (US); Yi Huang, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/157,402

(22) Filed: Jan. 25, 2021

(65) Prior Publication Data

US 2022/0239412 A1  Jul. 28, 2022

(51) Int. Cl.
*H04W 72/14* (2009.01)
*H04L 1/18* (2023.01)
*H04W 72/04* (2023.01)

(52) U.S. Cl.
CPC ............. *H04L 1/18* (2013.01); *H04W 72/042* (2013.01); *H04W 72/0413* (2013.01)

(58) Field of Classification Search
CPC ...... H04L 1/08; H04L 1/189; H04W 72/1289; H04W 16/14
See application file for complete search history.

(56) References Cited

U.S. PATENT DOCUMENTS

| | | | |
|---|---|---|---|
| 2020/0107356 A1 | 4/2020 | Rico Alvarino et al. | |
| 2020/0383105 A1 | 12/2020 | Park et al. | |
| 2022/0038211 A1* | 2/2022 | Talarico | H04W 74/0808 |
| 2022/0046696 A1* | 2/2022 | Park | H04L 1/189 |
| 2022/0124757 A1* | 4/2022 | Yi | H04L 5/0048 |

FOREIGN PATENT DOCUMENTS

WO  2022036579 A1  2/2022

OTHER PUBLICATIONS

Interdigital Inc: "On PUSCH Enhancements for eURLLC", 3GPP Draft, R1-1907109 On PUSCH Enhancements For eURLLC, 3rd Generation Partnership Project (3GPP), Mobile Competence Centre, 650, Route Des Lucioles, F-06921 Sophia-Antipolis Cedex, France, vol. RAN WG1, No. Reno, USA, Apr. 13, 2019-Apr. 17, 2019 May 13, 2019 (Apr. 13, 2019), 4 Pages, XP051728555, Retrieved from the Internet: URL: http://www.3gpp.org/ftp/Meetings%5F3GPP%5FSYNC/RAN1/Docs/R1%2D1907109%2Ezip [retrieved on May 13, 2019].

(Continued)

*Primary Examiner* — Mansour Oveissi
(74) *Attorney, Agent, or Firm* — Shumaker & Sieffert, P.A.

(57) ABSTRACT

Certain aspects of the present disclosure provide techniques for replacing and/or fixing broken uplink repetitions due to segmentation of nominal repetitions into actual repetitions. A method that may be performed by a user equipment (UE) includes detecting that a configured repetition pattern for uplink transmission to a network entity results in segmentation of at least one nominal repetition into multiple actual repetitions, modifying the configured repetition pattern, based at least in part on the detection, to avoid segmentation of nominal repetitions into multiple actual repetitions, and sending the uplink transmission to the network entity in accordance with the modified repetition pattern.

30 Claims, 14 Drawing Sheets

(56) References Cited

OTHER PUBLICATIONS

International Search Report and Written Opinion—PCT/US2022/013369—ISA/EPO—dated Apr. 21, 18 pp.

LG Electronics: "PUSCH Enhancements for NR URLLC", 3GPP Draft, 3GPP TSG RAN WG1 #98bis, R1-1910828 PUSCH Enhancements for NR URLLC, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019 Oct. 8, 2019 (Oct. 08, 2019), 16 Pages, XP051809217, Retrieved from the Internet: URL: https://ftp.3gpp.org/tsg_ran/WG1_RL1/TSGR1_98b/Docs/R1-1910828.zip R1-1910828.

Panasonic: "On PUSCH Enhancements for NR URLLC", 3GPP Draft, 3GPP TSG RAN WG1 #98, R1-1908939_PANASONIC_NR_URLLC_PUSCHL_ENHANCEMENTS_VFINAL, 3rd Generation Partnership Project (3GPP), Mobile Competence Centre, 650, Route Des Lucioles, F-06921 Sophia-Antipolis Cedex, FR, vol. RAN WG1, No. Prague, CZ, Aug. 26, 2019-Aug. 30, 2019 Aug. 16, 2019 (Aug. 16, 2019), 8 Pages, XP051765545, Retrieved from the Internet: URL: http://www.3gpp.org/ftp/tsg_ran/WG1_RL1/TSGR1_98/Docs/R1-1908939.zip [retrieved on Aug. 16, 2019].

\* cited by examiner

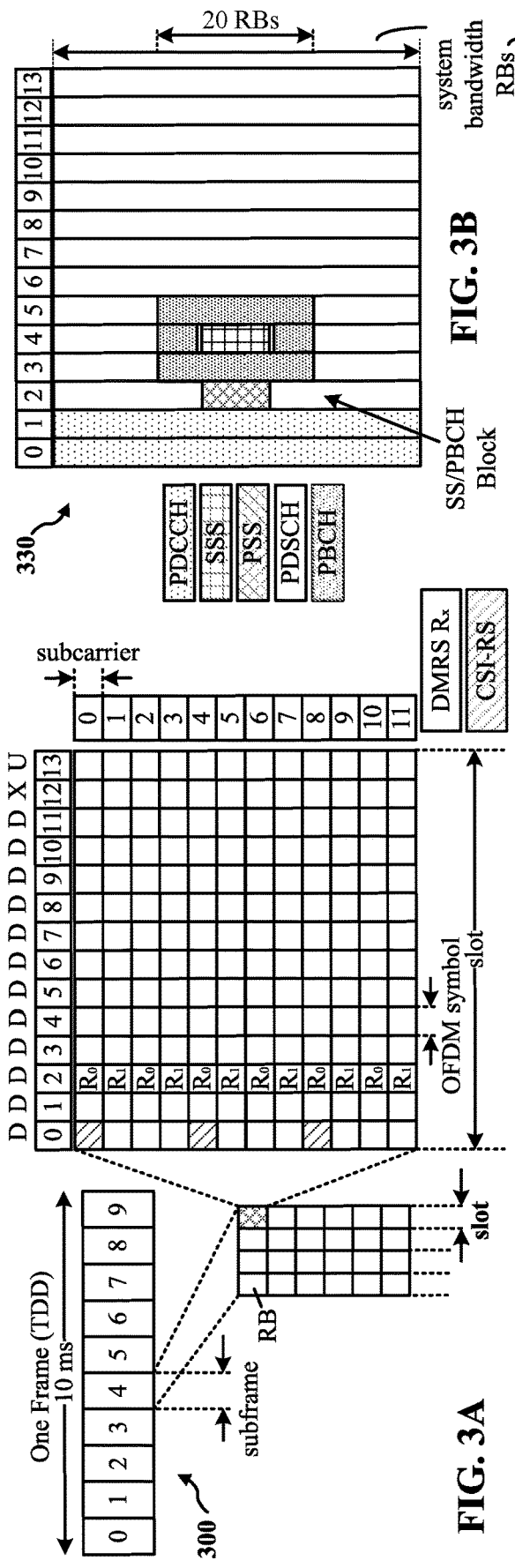
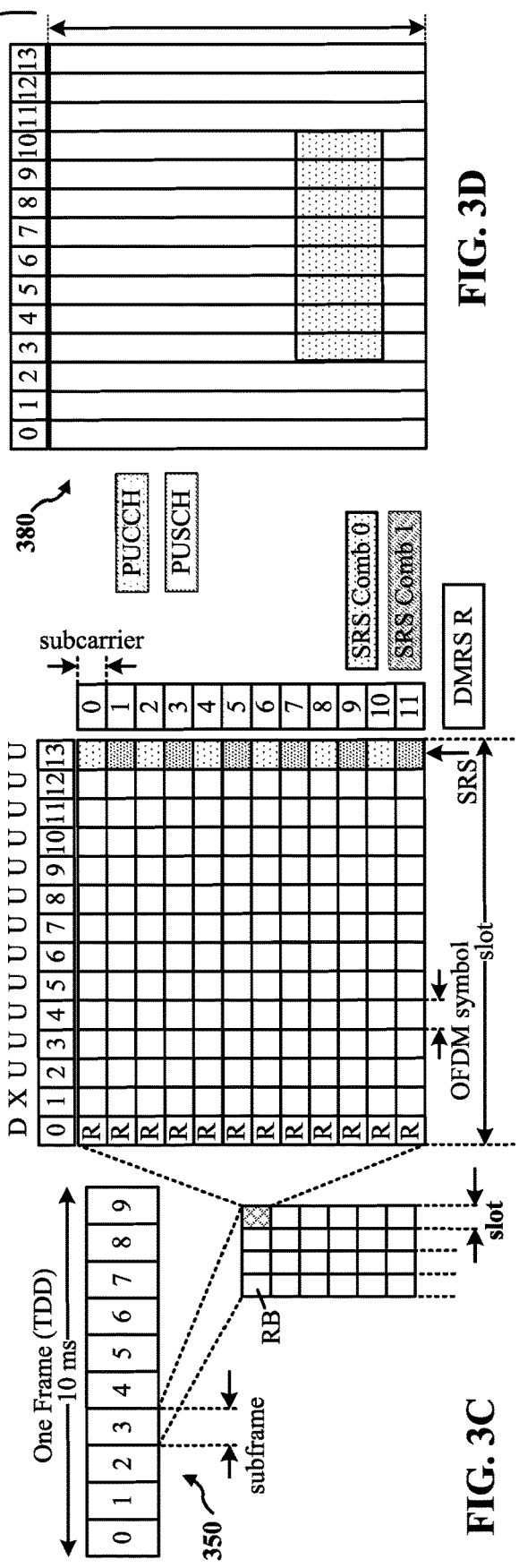

REPLACING BROKEN UPLINK REPETITIONS

BACKGROUND

Field of the Disclosure

Aspects of the present disclosure relate to wireless communications, and more particularly, to techniques for sending uplink transmissions with repetition.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These and other multiple access technologies have been adopted in various telecommunication standards to provide a common protocol that enables different wireless devices to communicate on a municipal, national, regional, and even global level. However, as the demand for mobile broadband access continues to increase, there exists a need for further improvements in these and emerging wireless communications technologies.

SUMMARY

Certain aspects of the present disclosure can be implemented in a method for wireless communication by a user equipment (UE). The method generally includes detecting that a configured repetition pattern for uplink transmission to a network entity results in segmentation of at least one nominal repetition into multiple actual repetitions, modifying the configured repetition pattern, based at least in part on the detection, to avoid segmentation of nominal repetitions into multiple actual repetitions, and sending the uplink transmission to the network entity in accordance with the modified repetition pattern.

Certain aspects of the present disclosure can be implemented in an apparatus for wireless communication by a UE. The apparatus generally includes a memory and at least one processor coupled to the memory, the memory and the at least one processor being configured to detect that a configured repetition pattern for uplink transmission to a network entity results in segmentation of at least one nominal repetition into multiple actual repetitions, modify the configured repetition pattern, based at least in part on the detection, to avoid segmentation of nominal repetitions into multiple actual repetitions, and send the uplink transmission to the network entity in accordance with the modified repetition pattern.

Certain aspects of the present disclosure can be implemented in an apparatus for wireless communication by a UE. The apparatus generally includes means for detecting that a configured repetition pattern for uplink transmission to a network entity results in segmentation of at least one nominal repetition into multiple actual repetitions, means for modifying the configured repetition pattern, based at least in part on the detection, to avoid segmentation of nominal repetitions into multiple actual repetitions, and means for sending the uplink transmission to the network entity in accordance with the modified repetition pattern.

Certain aspects of the present disclosure can be implemented in a computer readable medium having instructions stored thereon for detecting that a configured repetition pattern for uplink transmission to a network entity results in segmentation of at least one nominal repetition into multiple actual repetitions, modifying the configured repetition pattern, based at least in part on the detection, to avoid segmentation of nominal repetitions into multiple actual repetitions, and sending the uplink transmission to the network entity in accordance with the modified repetition pattern.

Certain aspects of the present disclosure can be implemented in a method for wireless communication by a network entity (e.g., a base station (BS)). The method generally includes configuring a UE with a repetition pattern for uplink transmission to the network entity that results in segmentation of at least one nominal repetition into multiple actual repetitions, and monitoring the uplink transmission from the UE in accordance with a modified repetition pattern, wherein the modified repetition pattern is a modified version of the configured repetition pattern such that the modified repetition pattern avoids segmentation of nominal repetitions into multiple actual repetitions.

Certain aspects of the present disclosure can be implemented in an apparatus for wireless communication by a network entity (e.g., a BS). The apparatus generally includes a memory and at least one processor coupled to the memory, the memory and the at least one processor being configured to configure a UE with a repetition pattern for uplink transmission to the network entity that results in segmentation of at least one nominal repetition into multiple actual repetitions, and monitor the uplink transmission from the UE in accordance with a modified repetition pattern, wherein the modified repetition pattern is a modified version of the configured repetition pattern such that the modified repetition pattern avoids segmentation of nominal repetitions into multiple actual repetitions.

Certain aspects of the present disclosure can be implemented in an apparatus for wireless communication by a network entity (e.g., a BS). The apparatus generally includes means for configuring a UE with a repetition pattern for uplink transmission to the network entity that results in segmentation of at least one nominal repetition into multiple actual repetitions, and means for monitoring the uplink transmission from the UE in accordance with a modified repetition pattern, wherein the modified repetition pattern is a modified version of the configured repetition pattern such that the modified repetition pattern avoids segmentation of nominal repetitions into multiple actual repetitions.

Certain aspects of the present disclosure can be implemented in a computer readable medium having instructions stored thereon for configuring a UE with a repetition pattern for uplink transmission to a network entity that results in segmentation of at least one nominal repetition into multiple actual repetitions, and monitoring the uplink transmission from the UE in accordance with a modified repetition pattern, wherein the modified repetition pattern is a modified version of the configured repetition pattern such that the modified repetition pattern avoids segmentation of nominal repetitions into multiple actual repetitions.

The following description and the appended drawings set forth in detail certain illustrative features of the one or more aspects. These features are indicative, however, of but a few of the various ways in which the principles of various aspects may be employed.

BRIEF DESCRIPTION OF THE FIGURES

The appended figures depict certain features of the various aspects described herein and are not to be considered limiting of the scope of this disclosure.

FIGS. 3A-3D depict various example aspects of data structures for a wireless communication network.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

One approach to improving the reliability of uplink transmissions, such as physical uplink control channel (PUCCH) and physical uplink shared channel (PUSCH) transmissions, involves repetition. Certain networks, such as 5G New Radio (NR) network, define various types of uplink repetition mechanisms (e.g., in Rel-16). For example, according to one type of repetition (referred to as repetition Type A), each repetition is contained within a slot, such that repetitions do not cross slot boundaries. A second type of repetition (referred to as repetition Type B), provides additional flexibility and allows for the segmentation of nominal repetitions that cross slot boundaries (or downlink symbols) into smaller segmented repetitions that do not cross slot boundaries (or downlink symbols). Unfortunately, in some cases, these segmented repetitions may be fairly small (e.g., as small as 1 symbol), which may limit the achievable coding gain.

Aspects of the present disclosure provide systems and methods for modifying a configured repetition pattern that would result in segmented repetitions. The repetition pattern may be modified to replace segmented actual repetitions with an unsegmented nominal repetition. In some cases, the segmented actual repetitions may still be sent, along with additional unsegmented nominal repetitions.

Brief Introduction to Wireless Communication Networks

Figure 1:
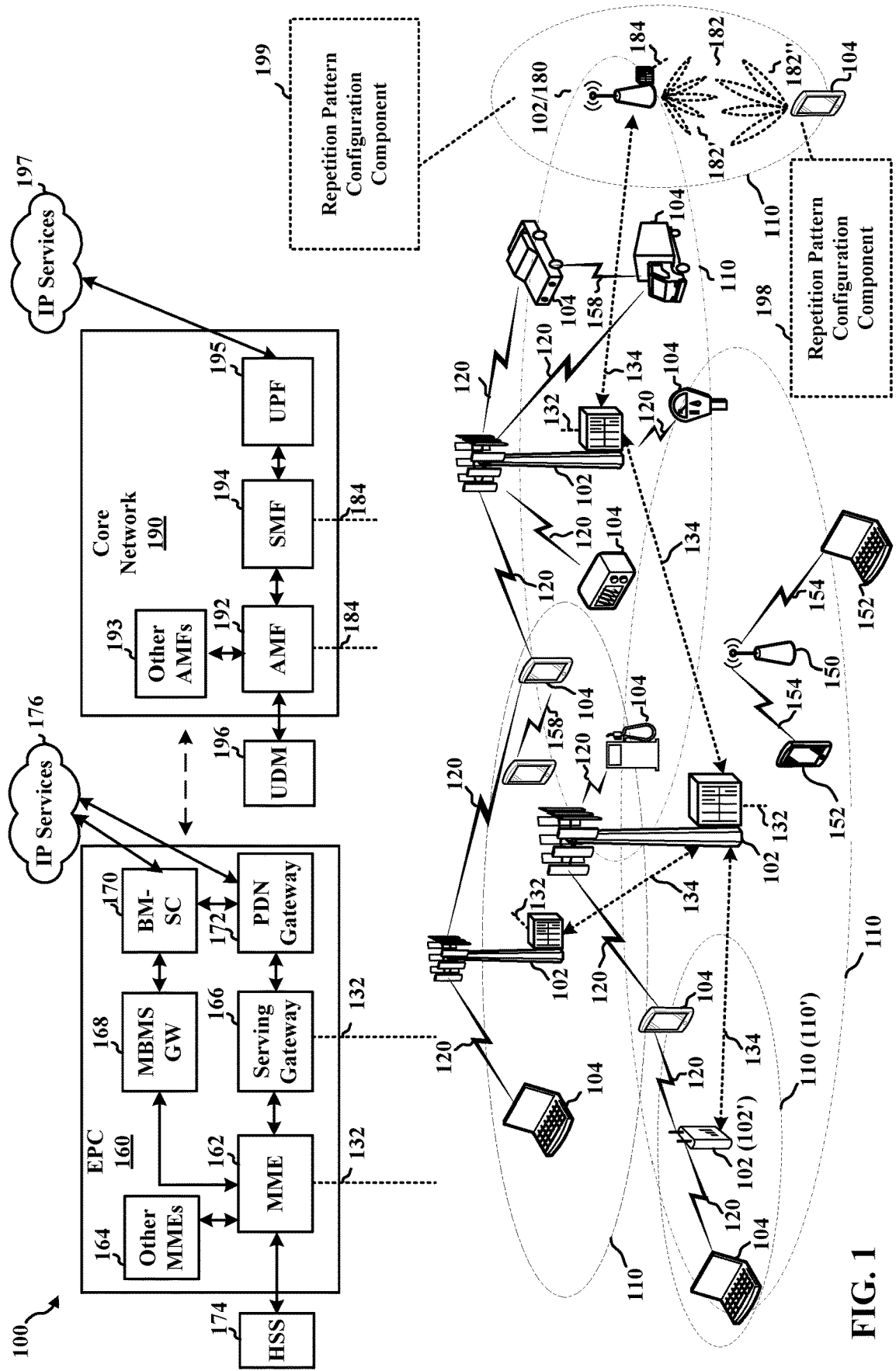
FIG. 1 is a block diagram conceptually illustrating an example wireless communication network, in accordance with certain aspects of the present disclosure.

FIG. 1 depicts an example of a wireless communications system 100, in which aspects described herein may be implemented. While FIG. 1 is briefly introduced here for context, additional aspects of FIG. 1 are described below.

Generally, wireless communications system 100 includes base stations (BSs) 102, user equipments (UEs) 104, an Evolved Packet Core (EPC) 160, and core network 190 (e.g., a 5G Core (5GC)), which interoperate to provide wireless communications services.

Base stations 102 may generally provide an access point to the EPC 160 and/or core network 190 for a UE 104, and may generally perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions, including those further described herein. Base stations described herein may include and/or be referred to as a gNB, Node B, eNB, an access point, a base transceiver station, a radio base station, a radio transceiver, or a transceiver function, or a transmit reception point (TRP) in various contexts.

Base stations 102 wirelessly communicate with UEs 104 via communications links 120. Each of base stations 102 may generally provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device (e.g., a smart watch, smart ring, smart bracelet, etc.), a vehicle, an electric meter, a gas pump, a large or small kitchen appliance, a healthcare device, an implant, a sensor/actuator, a display, or any other similar functioning device. Some of UEs 104 may be internet of things (IoT) devices (e.g., parking meter, gas pump, toaster, vehicles, heart monitor, etc.), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Figure 7:
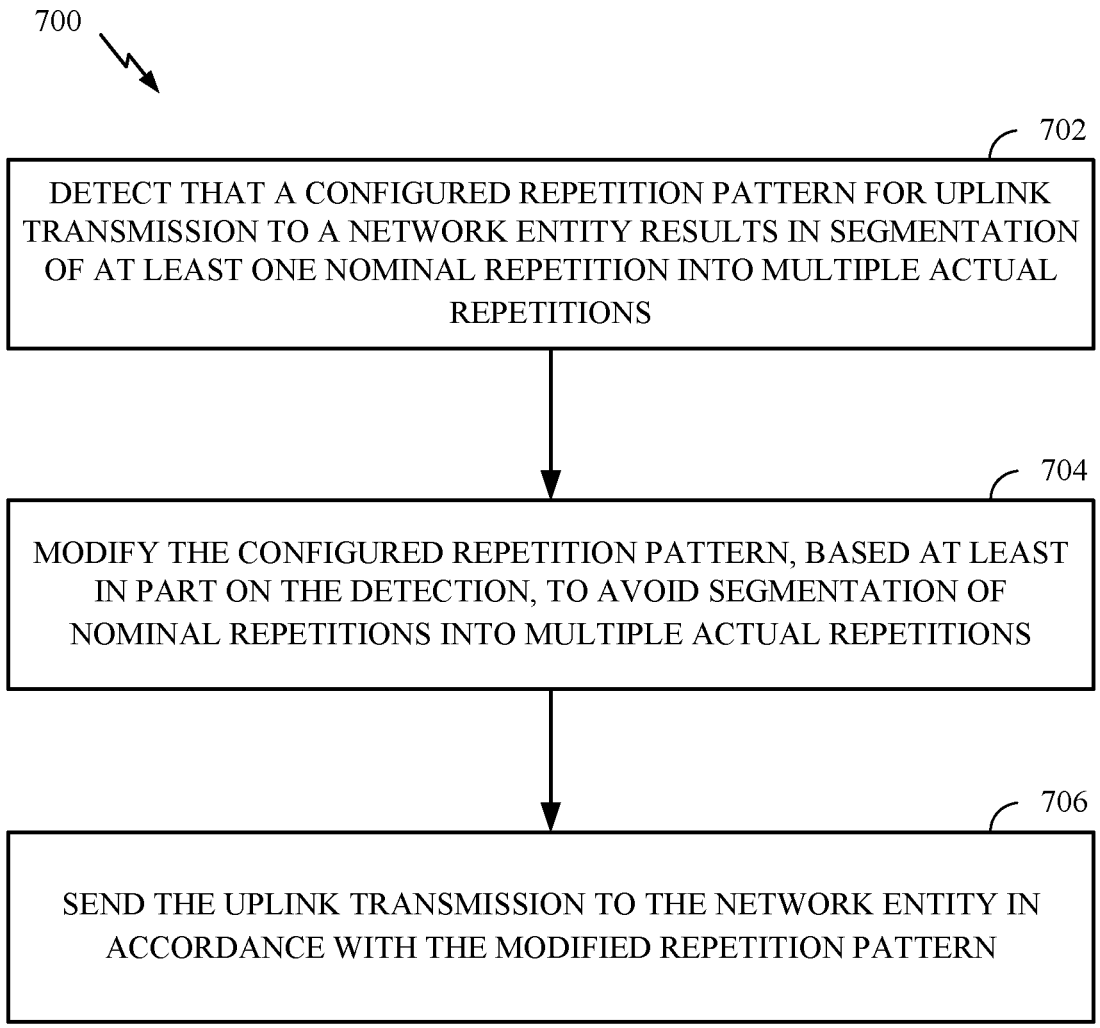
FIG. 7 is a flow diagram illustrating example operations for wireless communication by a user equipment (UE), in accordance with certain aspects of the present disclosure.
Figure 8:
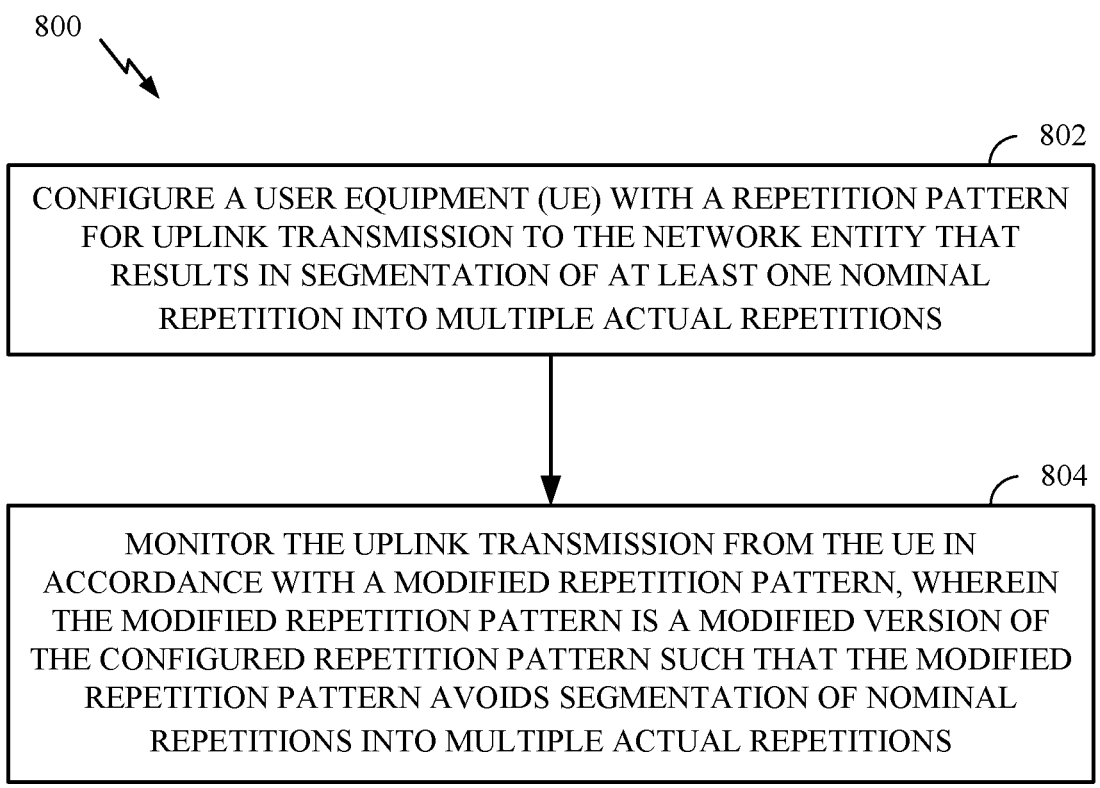
FIG. 8 is a flow diagram illustrating example operations for wireless communication by network entity (e.g., a base station (BS)), in accordance with certain aspects of the present disclosure.

In some cases, a base station 102 in the wireless communication network 100 may include a repetition pattern configuration component 199, which may be configured to perform the operations shown in FIG. 8, as well as other operations described herein for replacing/fixing broken uplink repetitions. Additionally, a UE 104 in the wireless communication network 100 may include a repetition pattern configuration component 198, which may be configured to perform the operations depicted and described with respect to FIG. 7, as well as other operations described herein for replacing/fixing broken uplink repetitions.

Figure 2:
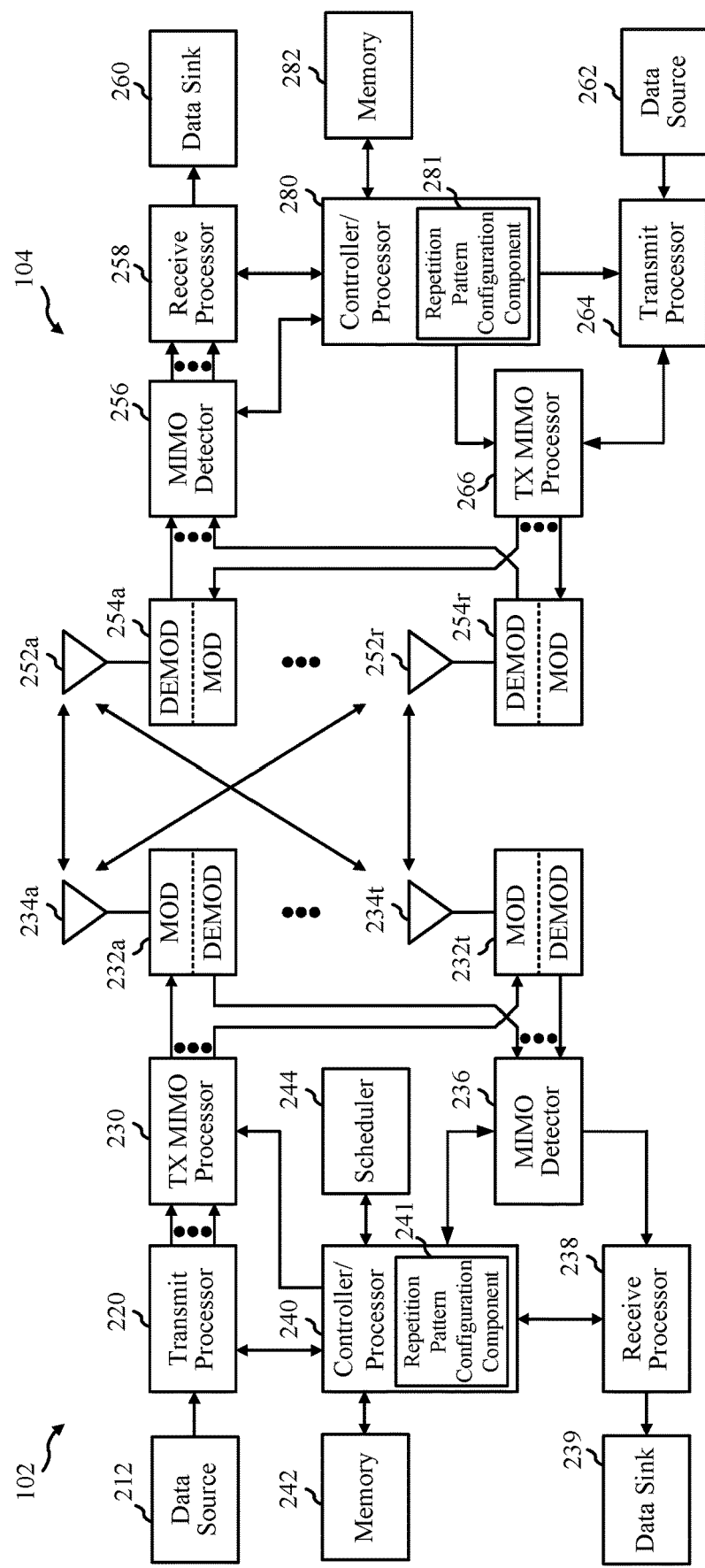
FIG. 2 is a block diagram conceptually illustrating aspects of an example a base station (BS) and user equipment (UE), in accordance with certain aspects of the present disclosure.

FIG. 2 depicts certain example aspects of a base station (BS) 102 and a user equipment (UE) 104. As with FIG. 1, FIG. 2 is briefly introduced here for context and additional aspects of FIG. 2 are described below.

Generally, BS 102 includes various processors (e.g., 220, 230, 238, and 240), antennas 234a-t, transceivers 232a-t, and other aspects, in order to transmit data (e.g., source data 212) and to receive data (e.g., data sink 239). For example, BS 102 may send and receive data between itself and UE 104.

In the depicted example, BS 102 includes controller/processor 240, which comprises a repetition pattern configuration component 241. In some cases, the repetition pattern configuration component 241 may be configured to implement repetition pattern configuration component 199 of FIG. 1 and to perform the operations depicted and described with respect to FIG. 8.

UE 104 generally includes various processors (e.g., 258, 264, 266, and 280), antennas 252a-r, transceivers 254a-r, and other aspects, in order to transmit data (e.g., source data 262) and to receive data (e.g., data sink 260).

In the depicted example, UE 104 includes controller/processor 280, which comprises a repetition pattern configuration component 281. In some cases, the repetition pattern configuration component 281 may be configured to implement the repetition pattern configuration component 198 of FIG. 1 and to perform the operations depicted and described with respect to FIG. 7.

FIGS. 3A-3D depict various example aspects of data structures for a wireless communication network, such as wireless communication network 100 of FIG. 1. In particular, FIG. 3A is a diagram 300 illustrating an example of a first subframe within a 5G (e.g., 5G NR) frame structure. FIG. 3B is a diagram 330 illustrating an example of DL channels within a 5G subframe. FIG. 3C is a diagram 350 illustrating an example of a second subframe within a 5G frame structure. FIG. 3D is a diagram 380 illustrating an example of UL channels within a 5G subframe.

Brief Introduction to mmWave Wireless Communications

The electromagnetic spectrum is often subdivided, based on frequency/wavelength, into various classes, bands, channels, etc. In various aspects, a frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmW/near mmW radio frequency band (e.g., 3 GHz-300 GHz) may have higher path loss and a shorter range compared to lower frequency communications. Accordingly, in FIG. 1, mmW base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same.

Similarly, the transmit and receive directions for UE 104 may or may not be the same.

Example Mechanisms for Replacing of Broken Uplink Repetitions

As noted above, 5G New Radio (NR) networks define different types of uplink (UL) repetition mechanisms (type A and type B) for physical UL shared channel (PUSCH) and/or a physical UL control channel (PUCCH) transmissions. Repetition may increase the likelihood of successful reception, for example, allowing for increased coding gain and soft combining at the network side.

Figure 4A:
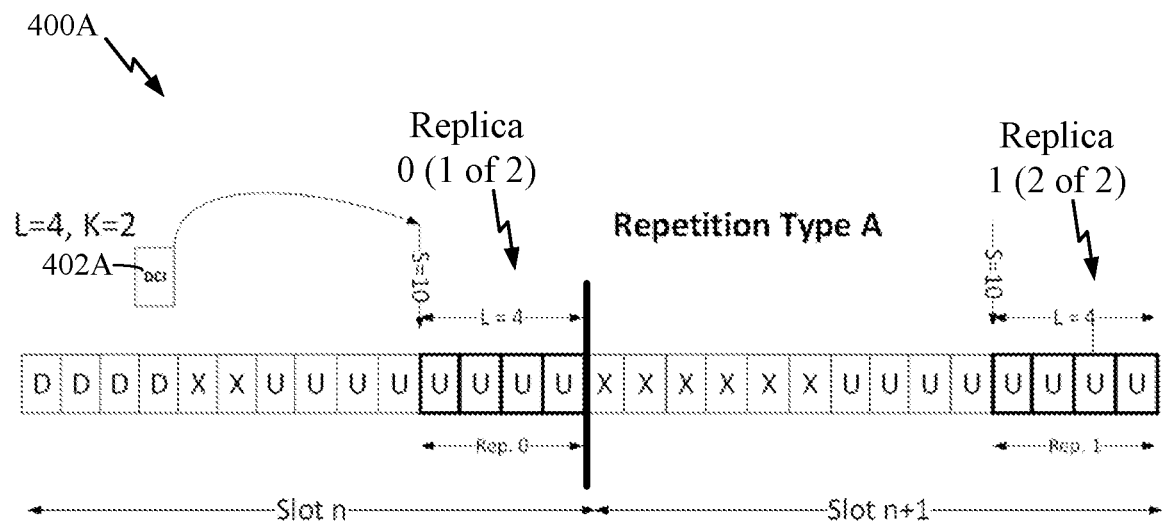
FIGS. 4A-4B are example timelines illustrating different uplink repetition types, respectively.

As illustrated in the timeline 400A of FIG. 4A, which illustrates an example scenario of repetition type A, a repetition pattern may be based on information (number K, length L, and starting symbol S) contained in a Start Length Information Value (SLIV) indicated via a DCI.

In the case of Type A, one PUSCH is transmitted in each slot and the time domain resource allocation (TDRA) is the same in each slot. Thus, as illustrated in FIG. 4A, repetitions repeat across slots, occupying the same resources in each slot. In the illustrated example, the repetition parameters (S, L, and K) may be configured in downlink control information (DCI) 402A conveying a SLIV. In the illustrated example, there are two repetitions (K=2) with a 4 symbol length (L=4). A first UL repetition 0 occurs in slot n, starting at a $10^{th}$ symbol (e.g., S=10), while the second repetition 0 occurs in slot n+1.

Figure 4B:
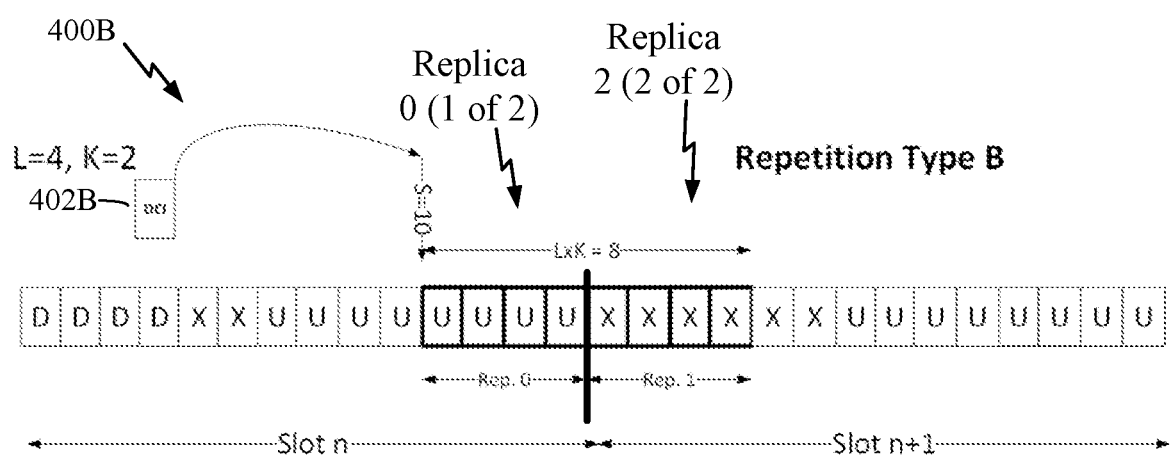

As illustrated in FIG. 4B, type B repetitions may be sent back-to-back within and/or across slots in accordance with the information in the configured SLIV (which may be a new format) conveyed the DCI 402B. For type B repetition, a TDRA field in the DCI may indicate the resource for a first "nominal" repetition. The time domain resources for the remaining repetitions may be derived based at least on the resources for the first repetition and UL/DL direction of symbols. The SLIV in the DCI indicates a "nominal" number of repetitions. The repetitions and number of repetitions are referred to as nominal because the scheduled repetitions may be considered theoretical in comparison to what is actually achievable (actual repetitions) based on actual uplink/downlink (UL/DL) direction of symbols in the relevant slot(s).

In the illustrated example, the configured starting symbol of 10 (S=10), number of repetitions (K=2), and length of each repetition (L=4) results in the first repetition (Rep. 0) occupying the last 4 symbols in slot n and the second repetition (Rep. 1) occupying the first four symbols of slot n+1). Thus, as illustrated, the repetitions cross the slot boundary. Type B repetition may provide enhanced flexibility, for example, allowing for a dynamic indication of a number of repetitions, inter-nominal PUSCH frequency hopping, and new UL/downlink (DL) symbol interaction (e.g., opportunistically allowing flexible symbols to be used for uplink repetition).

Figure 5:
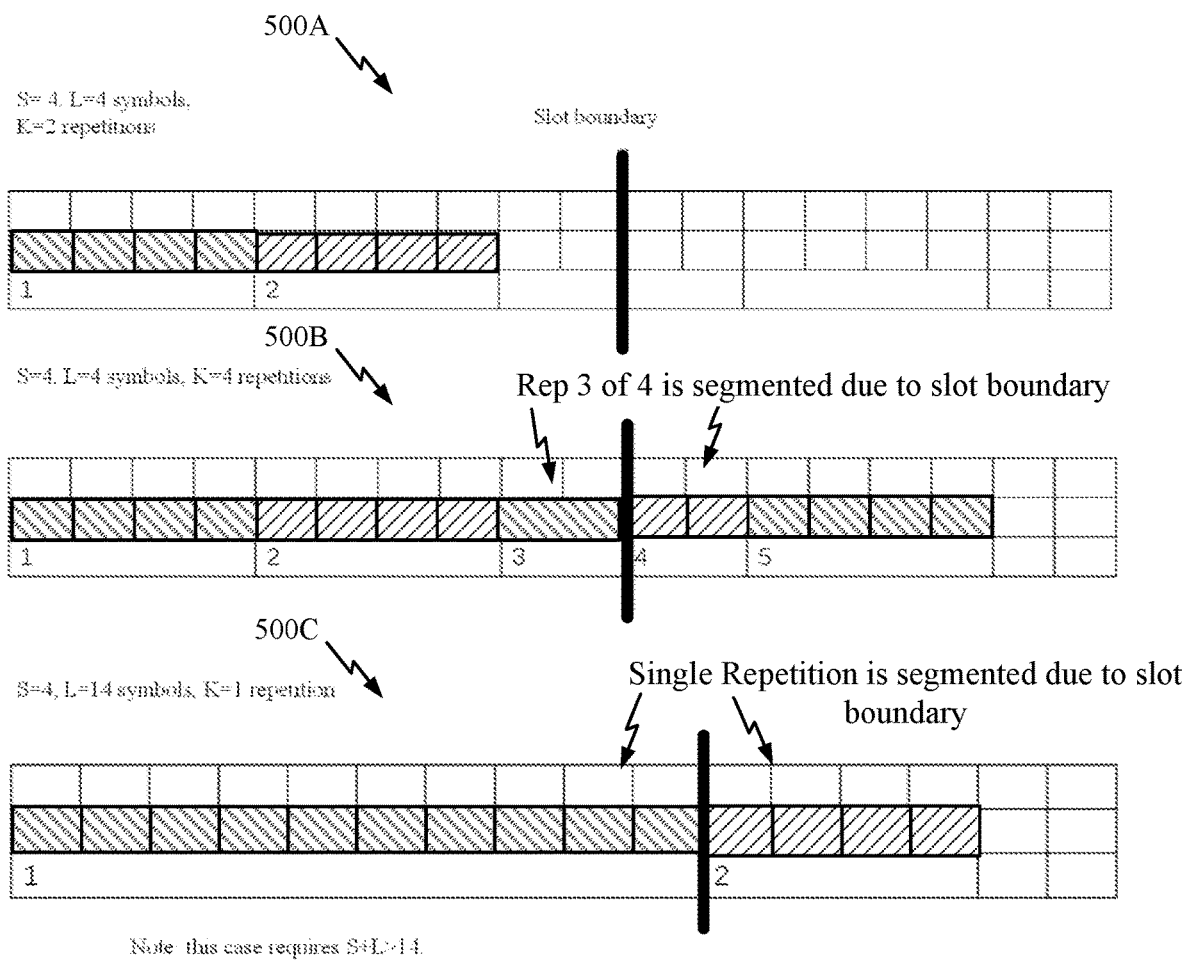
FIG. 5 illustrates example timelines of different scenarios of uplink repetitions.

FIG. 5 illustrates additional example timelines of type B slot repetitions. As shown in the first timeline 500A, with a starting symbol of 4 (S=4), 2 repetitions (K=2) of length 4 (L=4), both repetitions may be contained in the same slot (the repetitions do not cross the slot boundary).

As illustrated in timeline 500B, if the number of repetitions is increased to 4 (K=4), the third repetition of length 4 would cross the slot boundary. In such cases, this nominal repetition may be segmented, as shown, into two smaller actual repetitions of length 2. Similarly, as illustrated in timeline 500C, even if the number of repetitions is only 1 (K=1) but the length is increased to 14 (L=14), the single repetition of length 14 would cross the slot boundary. In such cases, this nominal repetition may be segmented, as shown, into two smaller actual repetitions of lengths 10 and 4.

Segmentation may also occur due to the occurrence of semi-static DL symbols, and/or in response to a parameter InvalidSymbolPattern (indicating the occurrence of a symbol not valid for a nominal uplink repetition).

Figure 6:
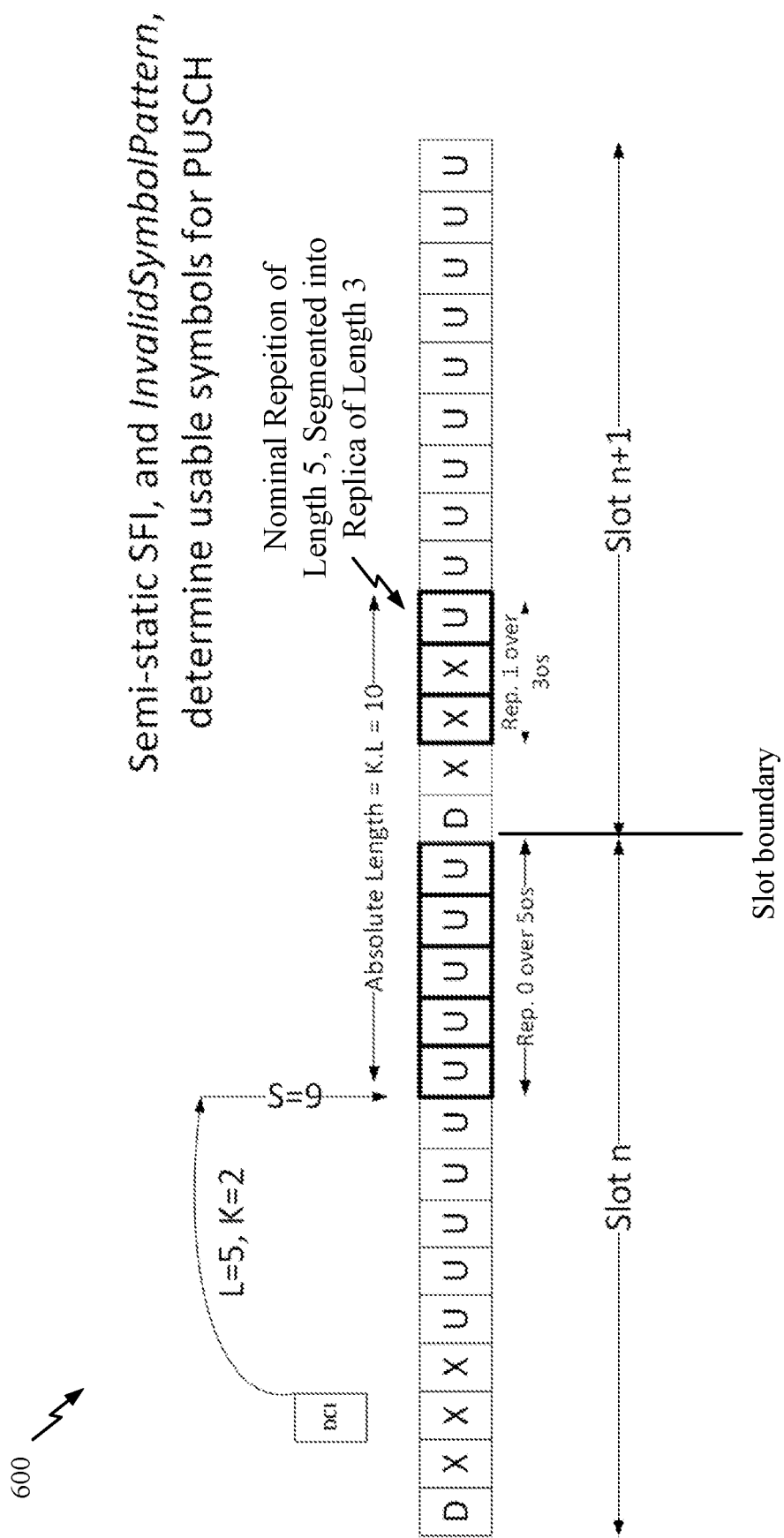
FIG. 6 illustrates an example timeline of uplink repetitions with segmentation.

FIG. 6 shows an example timeline 600 with segmentation of repetitions performed due to an interruption in valid uplink symbols (e.g., when a nominal repetition spans a downlink or flexible symbol). In the illustrated example, DCI configures two repetitions (K=2) of length 5 (L=5) to start at symbol 9 in slot n, resulting in a first repetition (Rep 0) in the last 5 symbols of slot n. Because the next adjacent symbols (the first two symbols) in slot n+1 are not uplink symbols, the second repetition (Rep. 1) is shortened to 3 symbols.

As noted above, small segmented repetitions may limit the achievable coding gain. As such, these small repetitions may be of little value and could be dropped.

Accordingly, certain aspects provide techniques for maintaining reliability or even increasing reliability of UL repetitions by modifying configured repetition patterns (e.g., dynamically configured via a DCI conveyed SLIV) to avoid segmentation. For example, a UE may detect that a configured UL repetition pattern results in segmentation (e.g., of a nominal repetition into multiple actual repetitions) and modify the configured repetition patter to avoid such segmentation. In some cases, the modification by the UE may result in replacing the segmented actual repetitions with an unsegmented nominal repetition and/or adding more nominal repetitions.

FIG. 7 is a flow diagram illustrating example operations 700 for wireless communication, in accordance with certain aspects of the present disclosure.

The operations 700 may be performed, for example, by a UE (e.g., such as the UE 104 in the wireless communication network 100) capable of modifying a configured repetition pattern to avoid segmentation of nominal repetitions into multiple actual repetitions. The operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 begins, at 702, by detecting that a configured repetition pattern for uplink transmission to a network entity results in segmentation of at least one nominal repetition into multiple actual repetitions. For example, the detected segmentation may be a result of nominal repetitions, corresponding to a configured set of S, K, and L values, crossing a slot boundary and/or experiencing a DL interruption.

At 704, the UE modifies the configured repetition pattern, based at least in part on the detection, to avoid segmentation of nominal repetitions into multiple actual repetitions. In some cases, the UE modification to the configured repetition pattern results in searching for suitable symbol locations that allow replacing at least one of the actual repetitions with an unsegmented nominal repetition and/or adding one or more nominal repetitions. In some cases, the UE coordinates (e.g., via signaling) with a network entity to configure how and when the UE performs the modification. For example, the UE may receive signaling indicating a threshold value (indicating a number of symbols for a minimum segmented repetition before modification) or a specified time period (indicating a time in which the UE has to find suitable symbol locations for a nominal/non-segmented repetition), and the UE may modify the configured repetition pattern according to such signaling.

At 706, the UE sends the uplink transmission to the network entity in accordance with the modified repetition pattern.

FIG. 8 is a flow diagram illustrating example operations 800 for wireless communication by a network entity (e.g., a base station) that may be considered complementary to operations 700 of FIG. 7. For example, the operations 800 may be performed by a BS (e.g., such as the BS 102 in the wireless communication network 100) for monitoring for uplink repetitions sent according to a repetition pattern modified by a UE (performing operations 700 of FIG. 7) to avoid segmentation. The operations 800 may be implemented as software components that are executed and run on one or more processors (e.g., controller/processor 240 of FIG. 2). Further, the transmission and reception of signals by the BS in operations 800 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 800 begin, at 802, by configuring a UE with a repetition pattern for uplink transmission to the network entity that results in segmentation of at least one nominal repetition into multiple actual repetitions.

As noted above, in some cases, the network entity provides additional signaling including a threshold value, a time period, and/or a time when the UE is to expect future signaling indicating the UE can refrain from sending one or more repetitions.

At 804, the network entity monitors the uplink transmission from the UE in accordance with a modified repetition pattern, wherein the modified repetition pattern is a modified version of the configured repetition pattern such that the modified repetition pattern avoids segmentation of nominal repetitions into multiple actual repetitions.

In some cases, the network entity sends an indication (e.g., an acknowledgement (ACK) indication) to the UE, which communicates to the UE that the network entity has successfully received the monitored uplink transmission, and UE may refrain from sending one or more of the repetitions (e.g., the rest of the repetitions).

Figure 9:
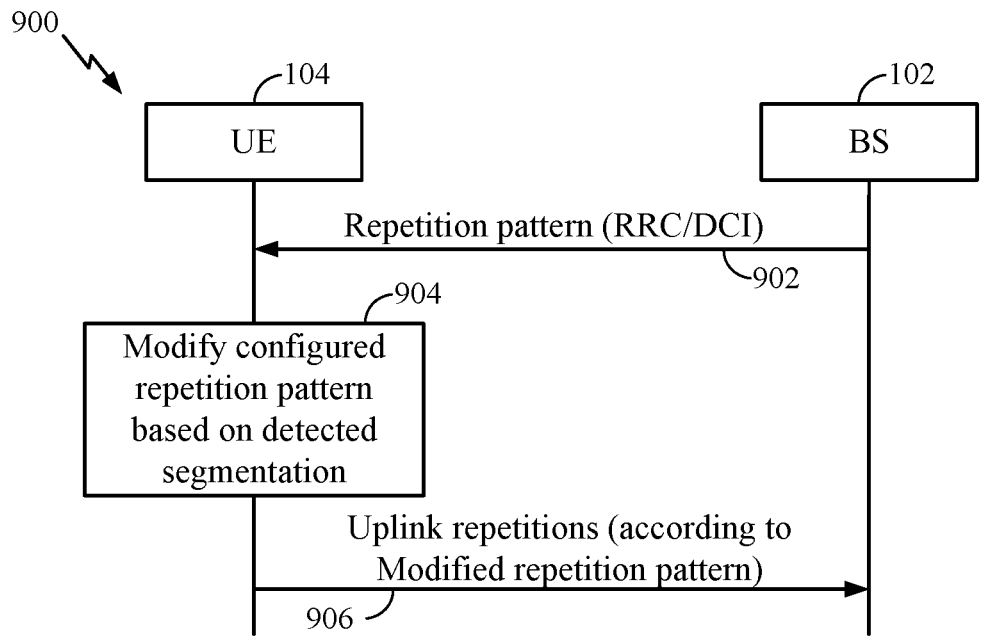
FIG. 9 is an example call flow diagram illustrating example uplink transmissions with repetition, in accordance with certain aspects of the present disclosure.

Example Information Flows Between a Base Station and User Equipment for Replacing Broken Uplink Repetitions Operations 700 and 800 of FIGS. 7 and 8 may be understood with reference to the example call flow diagram 900 of FIG. 9, which shows interactions between a BS 102 and a UE 104 sending uplink repetitions according to a repetition pattern modified to avoid segmentation, in accordance to aspects of the present disclosure.

At 902, the BS 102 configures the UE 104 with a repetition pattern, for example, via DCI and/or via RRC signaling. In some cases, a table of SLIV values may be configured via RRC signaling, while DCI may indicate a particular row in the table. At 904, if the UE detects the configured repetition pattern will result in segmentation, the UE modifies the configured repetition pattern (e.g., to avoid segmentation). At 906, the UE sends uplink repetitions (e.g., a PUSCH or PUCCH) according to the modified repetition pattern.

Figure 10:
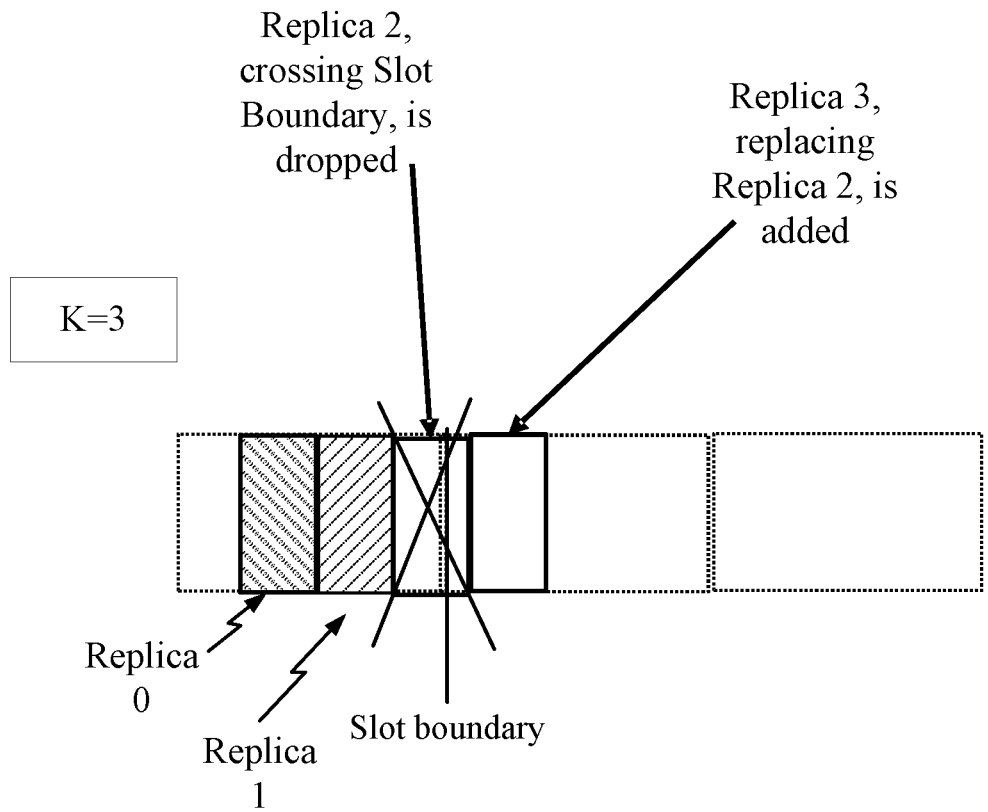
FIG. 10 is an example timeline illustrating a modification to a configured repetition pattern, in accordance with certain aspects of the present disclosure.

FIG. 10 illustrates one example of how a configured repetition pattern may be modified to avoid segmentation. The example assumes the UE is configured with 3 repetitions (e.g., K=3) and the original repetition pattern results in first and second replicas (Replica 0 and Replica 1) fully contained in one slot and a third replica (Replica 2) crossing the slot boundary, thus resulting in segmentation of this Replica (into smaller actual repetitions before and after the slot boundary). In this example, modifying the configured repetition pattern results in dropping the segmented replicas (as indicated by the X) and adding an additional unsegmented nominal repetition (Replica 3).

In some cases, the UE may maintain (continue to send) segmented replicas, even when sending additional nominal replicas, when certain conditions are met. Maintaining the segmented replicas may add some coding gain, for example, if they are greater than equal a threshold (e.g., a number of symbols).

Figure 11:
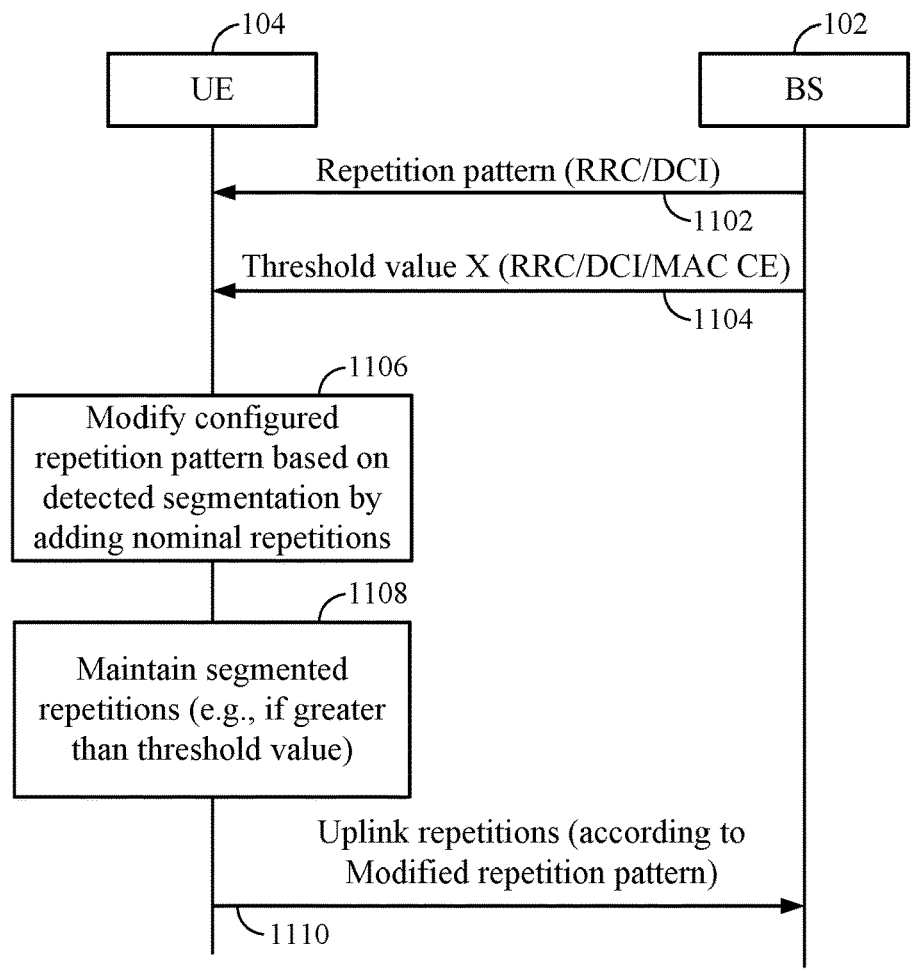
FIG. 11 is another example call flow diagram illustrating example uplink transmissions with repetition, in accordance with certain aspects of the present disclosure.

FIG. 11 illustrates an example call flow diagram where a UE is configured to modify a repetition pattern when segmentation is detected, while also sending segmented repetitions.

At 1102, the BS 102 configures the UE 104 with a repetition pattern. At 1104, the BS 102 also configures the UE with a threshold value. At 1106, if the UE detects the configured repetition pattern will result in segmentation, the UE modifies the configured repetition pattern. In this case, however, at 1108, the UE maintains segmented repetitions if they are greater than or equal to the configured threshold value (e.g., N symbols where N<L). At 1110, the UE sends uplink repetitions according to the modified repetition pattern.

Figure 12:
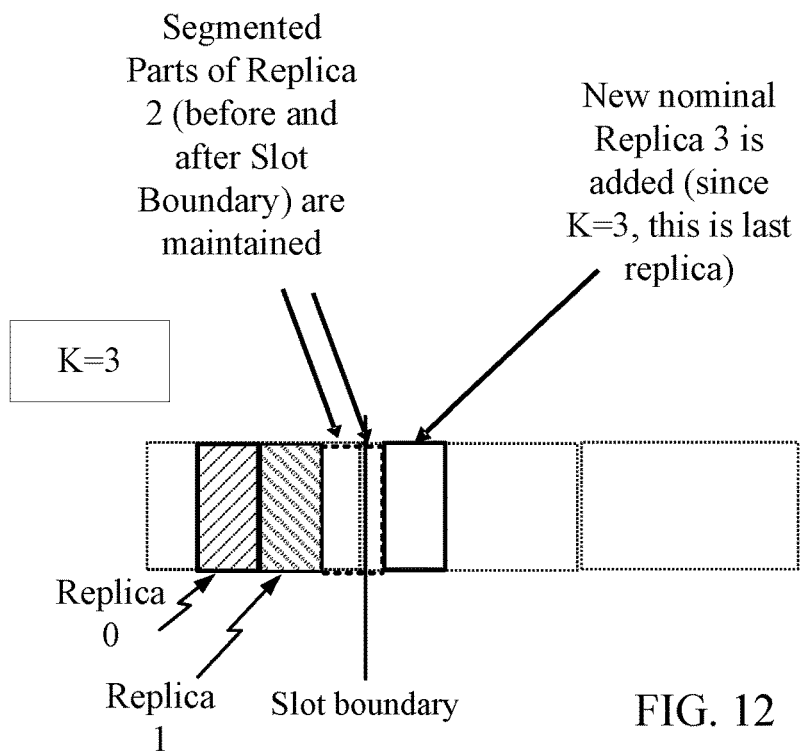
FIG. 12 is another example timeline illustrating a modification to a configured repetition pattern, in accordance with certain aspects of the present disclosure.

FIG. 12 illustrates one example of how a configured repetition pattern may be modified to include new replicas, in addition to segmented repetitions. The example again assumes the UE is configured with 3 repetitions (e.g., K=3) and the original repetition pattern results in Replica 0 and Replica 1 fully contained in one slot and Replica 2 crossing the slot boundary, resulting in segmentation. In this example, however, rather than simply dropping Replica 2, the segmented parts are maintained (assuming they are greater than equal to the threshold value), while still adding new nominal replica 3. In some cases, new replicas may be added only until the original configured number of nominal (non-segmented) repetitions is met. In this case, since newly added Replica 3 is the third nominal repetition (and configured K=3), this is the last replica.

Figure 13:
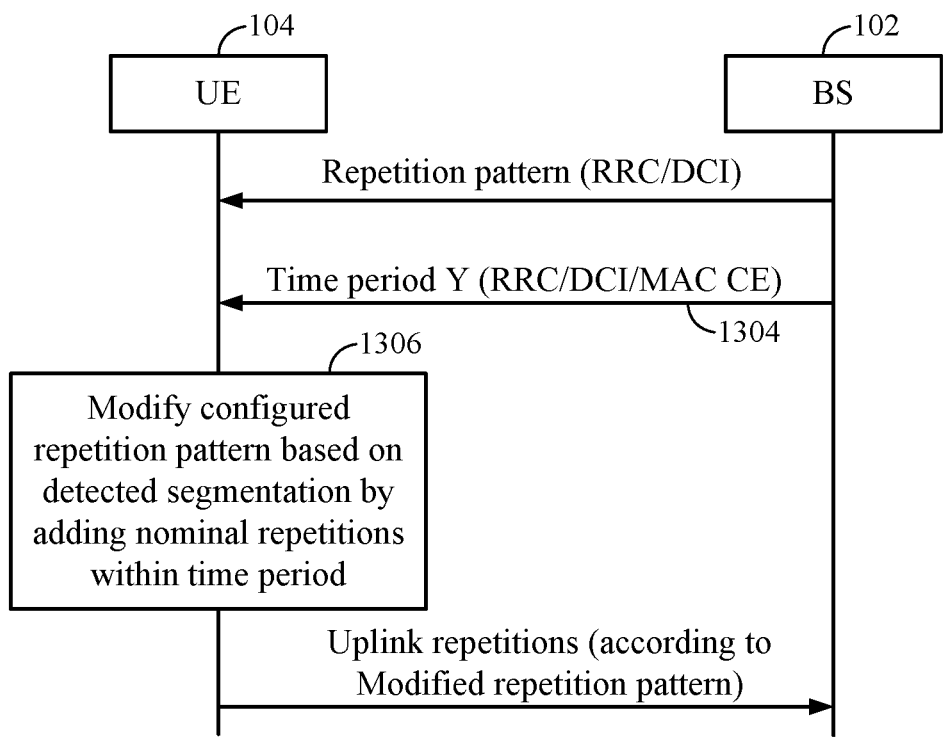
FIGS. 13 and 14 are example call flow diagrams further illustrating example uplink transmissions with repetition, in accordance with certain aspects of the present disclosure.

In some cases, the UE may have a time limit on how long it can search for symbol locations to add non-segmented repetitions. For example, as illustrated in FIG. 13, the UE may be configured (at 1304) with a time period of Y symbols. In this example, when modifying the repetition pattern, at 1306, the UE may stop searching for a location to send a nominal (unsegmented) repetition if it is unable to send the configured number of nominal repetitions (K) within Y symbols (or trials).

Figure 14:
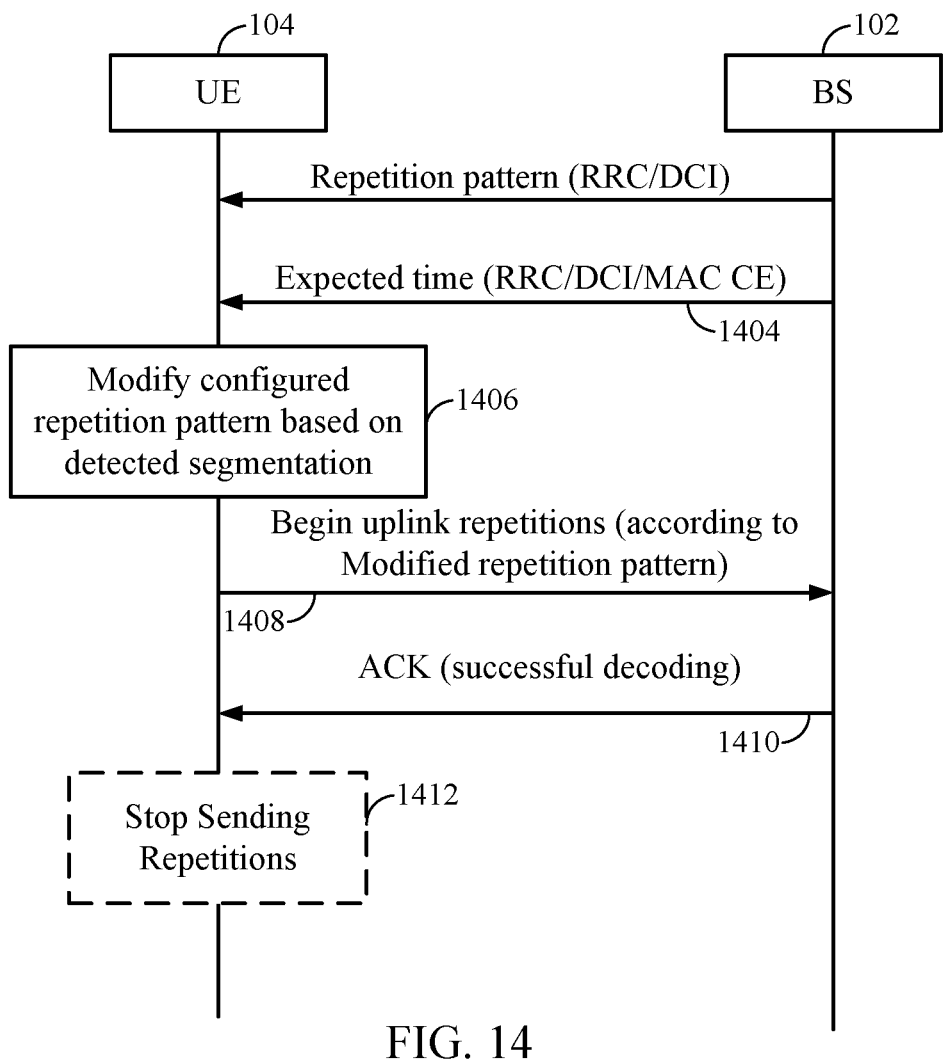

In some cases, the base station (e.g., gNB) may send acknowledgment (ACK/NACK or ACK only) if the uplink transmission is successfully received. This signaling may serve as an early termination of sorts, allowing the UE to stop sending repetitions, which may help conserve power. In some cases, as illustrated in FIG. 14, the UE may be configured (at 1404) with an expected time the BS is expected to signal the feedback. This may be indicated as a time period after a last uplink OFDM symbol of the last repetition configured in the DCI (before modifying the repetition pattern to include replacements repetitions of segments).

As illustrated, after modifying the configured repetition pattern based on detected segmentation, at 1406, the UE may begin sending the uplink repetitions (according to the modified repetition pattern), at 1408. In the illustrated example, the BS successfully decodes the uplink transmission and signals an ACK to the UE, at 1410. In response to the ACK, the UE stops sending repetitions, at 1412. On the other hand, if the BS 102 does not signal the ACK, the UE may finish sending all of the repetitions.

Example Wireless Communication Devices

Figure 15:
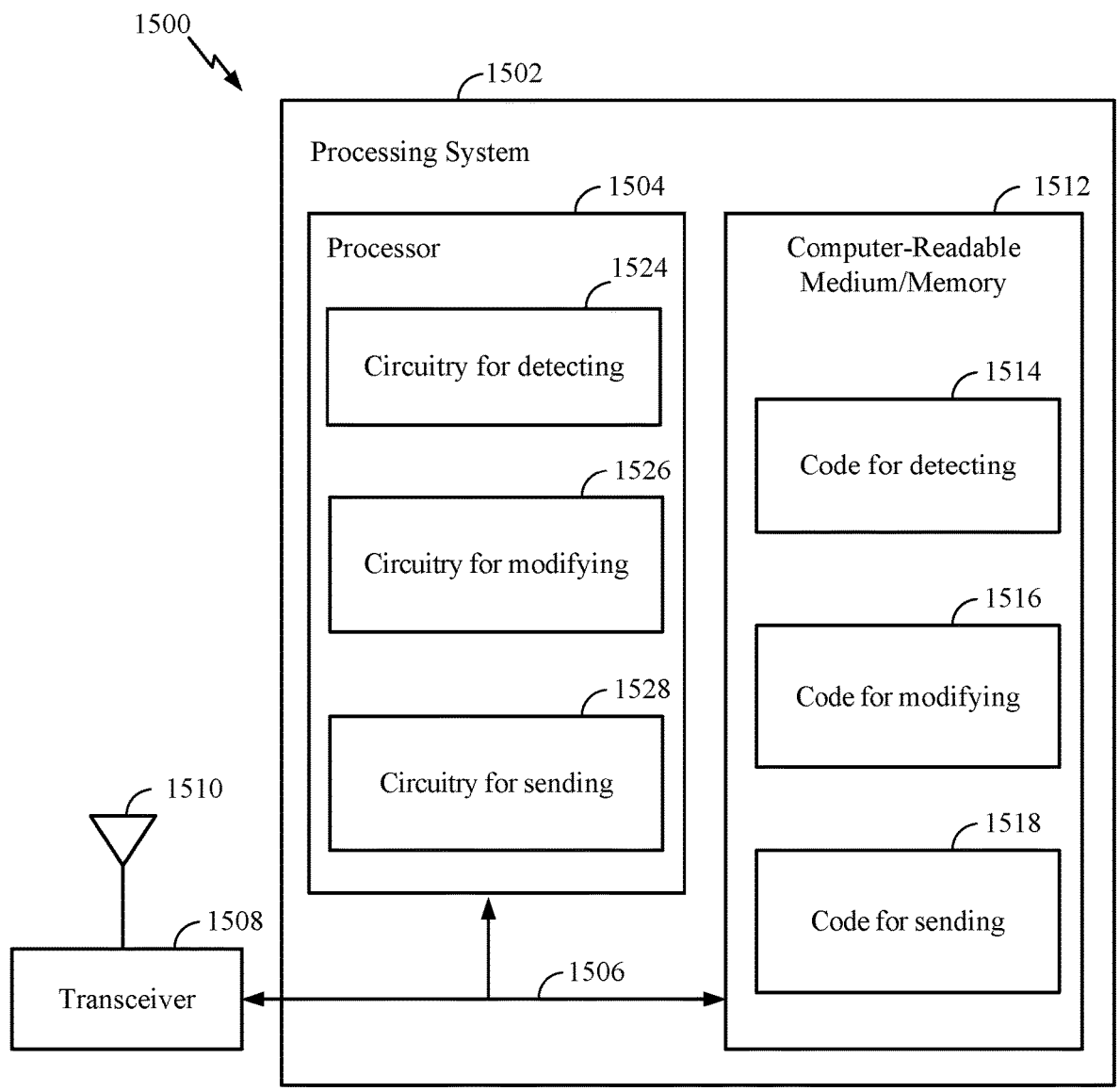
FIG. 15 illustrates an example wireless communications device configured to perform operations for the methods disclosed herein, in accordance with certain aspects of the present disclosure.

FIG. 15 illustrates a communications device 1500 that may include various components (e.g., corresponding to means-plus-function components) configured to perform operations for the techniques disclosed herein, such as the operations illustrated in FIG. 7. In some cases, the communications device 1500 may include the UE 104 illustrated in FIG. 1 and FIG. 2.

Communications device 1500 includes a processing system 1502 coupled to a transceiver 1508 (e.g., a transmitter and/or a receiver). Transceiver 1508 is configured to transmit and receive signals for the communications device 1500 via an antenna 1510, such as the various signals as described herein. Processing system 1502 may be configured to perform processing functions for communications device 1500, including processing signals received and/or to be transmitted by communications device 1500. The transceiver 1508 can include one or more components of UE 104 with reference to FIG. 2 such as, for example, transceiver 254, TX MIMO processor 266, transmit processor 264, receive processor 258, MIMO detector 256, and/or the like.

Processing system 1502 includes a processor 1504 coupled to a computer-readable medium/memory 1512 via a bus 1506. In certain aspects, computer-readable medium/memory 1512 is configured to store instructions (e.g., computer-executable code) that when executed by processor 1504, cause processor 1504 to perform the operations illustrated in FIG. 7, or other operations for performing the various techniques discussed herein for modifying a configured repetition pattern to avoid segmentation of nominal repetitions into multiple actual repetitions. In some cases, the processor 1504 can include one or more components of UE 104 with reference to FIG. 2 such as, for example, controller/processor 280 (including the repetition pattern configuration component 281), transmit processor 264, receive processor 258, and/or the like. Additionally, in some cases, the computer-readable medium/memory 1512 can include one or more components of UE 104 with reference to FIG. 2 such as, for example, memory 282 and/or the like.

In certain aspects, computer-readable medium/memory 1512 stores code 1514 for detecting, code 1516 for modifying, and code 1518 for sending.

In some cases, the code 1514 for detecting may include code for detecting that a configured repetition pattern for uplink transmission to a network entity results in segmentation of at least one nominal repetition into multiple actual repetitions.

In some cases, the code 1516 for modifying may include code for modifying the configured repetition pattern, based at least in part on the detection, to avoid segmentation of nominal repetitions into multiple actual repetitions.

In some cases, code 1518 for sending may include code for sending the uplink transmission to the network entity in accordance with the modified repetition pattern.

In certain aspects, processor 1504 has circuitry configured to implement the code stored in the computer-readable medium/memory 1512. For example, processor 1504 includes circuitry 1524 for detecting, circuitry 1526 for modifying, and circuitry 1528 for sending.

In some cases, the circuitry 1524 for detecting may include circuitry for detecting that a configured repetition pattern for uplink transmission to a network entity results in segmentation of at least one nominal repetition into multiple actual repetitions.

In some cases, the circuitry 1526 for modifying may include circuitry for modifying the configured repetition pattern, based at least in part on the detection, to avoid segmentation of nominal repetitions into multiple actual repetitions.

In some cases, circuitry 1528 for sending may include circuitry for sending the uplink transmission to the network entity in accordance with the modified repetition pattern.

In some examples, means for detecting may include the controller/processor 280 and/or the repetition pattern configuration component 281 of the UE 104 illustrated in FIG. 2, and/or circuitry 1526 for detecting of the communication device 1500 in FIG. 15.

In some examples, means for modifying may include the controller/processor 280 and/or the repetition pattern configuration component 281 of the UE 104 illustrated in FIG. 2, and/or circuitry 1526 for modifying of the communication device 1500 in FIG. 15.

In some examples, means for sending may include the transmitter unit 254 and/or antenna(s) 252 of the UE 104 illustrated in FIG. 2 and/or circuitry 1528 for sending of the communication device 1500 in FIG. 15.

Figure 16:
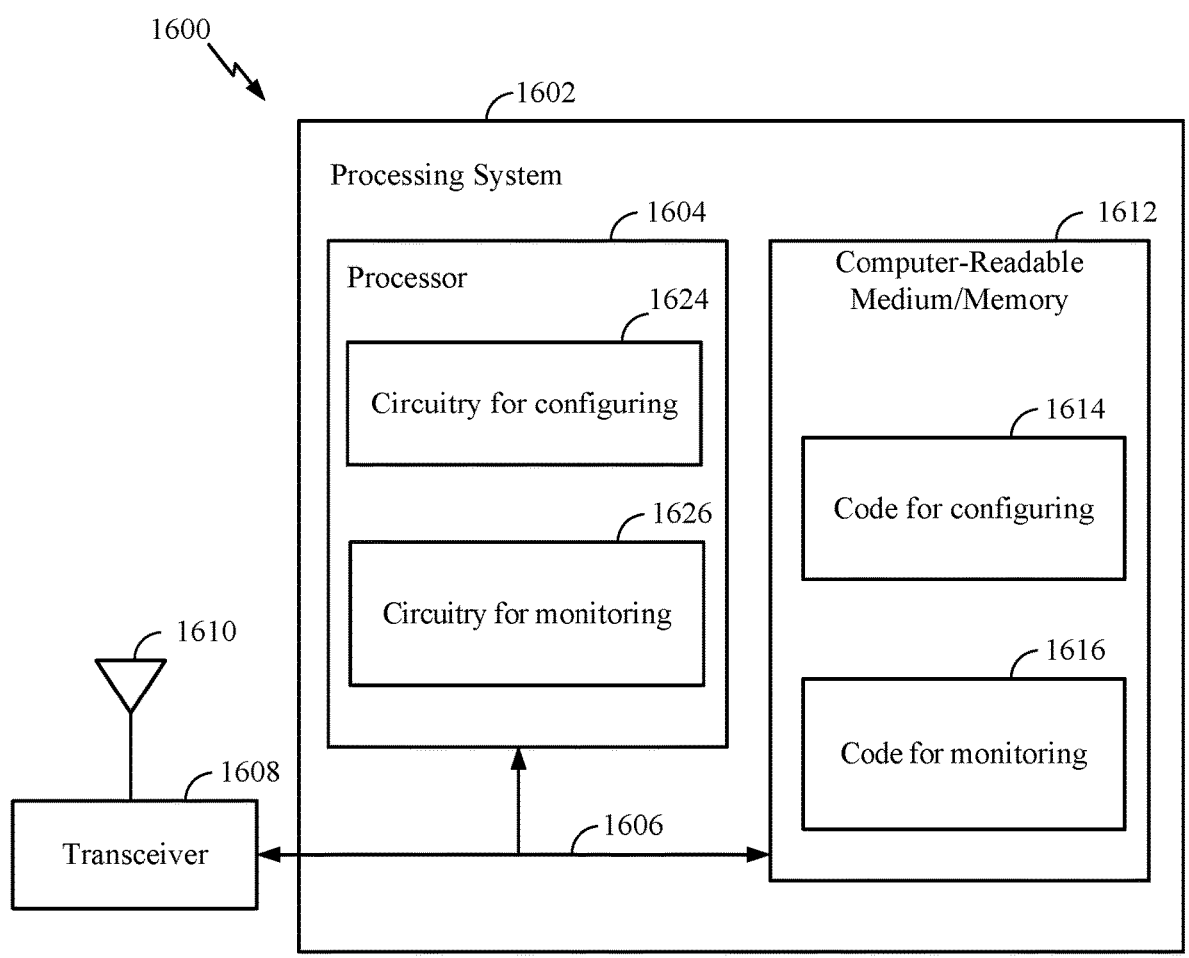
FIG. 16 illustrates an example wireless communications device configured to perform operations for the methods disclosed herein, in accordance with certain aspects of the present disclosure.

FIG. 16 illustrates a communications device 1600 that may include various components (e.g., corresponding to means-plus-function components) configured to perform operations for the techniques disclosed herein, such as the operations illustrated in FIG. 8. In some cases, the communications device 1600 may include the BS 102 illustrated in FIG. 1 and FIG. 2.

Communications device 1600 includes a processing system 1602 coupled to a transceiver 1608 (e.g., a transmitter and/or a receiver). Transceiver 1608 is configured to transmit and receive signals for the communications device 1600 via an antenna 1610, such as the various signals as described herein. Processing system 1602 may be configured to perform processing functions for communications device 1600, including processing signals received and/or to be transmitted by communications device 1600. The transceiver 1608 can include one or more components of BS 102 with reference to FIG. 2 such as, for example, transceiver 232, TX MIMO processor 230, transmit processor 220, receive processor 238, MIMO detector 236, and/or the like.

Processing system 1602 includes a processor 1604 coupled to a computer-readable medium/memory 1612 via a bus 1606. In certain aspects, computer-readable medium/memory 1612 is configured to store instructions (e.g., computer-executable code) that when executed by processor 1604, cause processor 1604 to perform the operations illustrated in FIG. 8, or other operations for performing the various techniques discussed herein for replacing/fixing broken uplink repetitions. In some cases, the processor 1604 can include one or more components of BS 102 with reference to FIG. 2 such as, for example, controller/processor 240 (including the repetition pattern configuration component 241), transmit processor 220, receive processor 238, and/or the like. Additionally, in some cases, the computer-readable medium/memory 1612 can include one or more components of BS 102 with reference to FIG. 2 such as, for example, memory 242 and/or the like.

In certain aspects, computer-readable medium/memory 1612 stores code 1614 for configuring and code 1616 for monitoring.

In some cases, the code 1616 for configuring may include code for configuring a UE with a repetition pattern for uplink transmission to the network entity that results in segmentation of at least one nominal repetition into multiple actual repetitions.

In some cases, the code 1614 for monitoring may include code for monitoring the uplink transmission from the UE in accordance with a modified repetition pattern, wherein the modified repetition pattern is a modified version of the configured repetition pattern such that the modified repetition pattern avoids segmentation of nominal repetitions into multiple actual repetitions.

In certain aspects, processor 1604 has circuitry configured to implement the code stored in the computer-readable medium/memory 1612. For example, processor 1604 includes circuitry 1624 for configuring and circuitry 1626 for monitoring.

In some cases, the circuitry 1626 for configuring may include circuitry for configuring a UE with a repetition pattern for uplink transmission to the network entity that results in segmentation of at least one nominal repetition into multiple actual repetitions.

In some cases, the circuitry 1624 for monitoring may include circuitry for monitoring the uplink transmission from the UE in accordance with a modified repetition pattern, wherein the modified repetition pattern is a modified version of the configured repetition pattern such that the modified repetition pattern avoids segmentation of nominal repetitions into multiple actual repetitions.

In some examples, means for configuring may include a transmitter and/or an antenna(s) 234 and/or the controller/processor 240 of the BS 102 illustrated in FIG. 2 and/or circuitry 1624 for configuring of the communication device 1600 in FIG. 16.

In some examples, means for monitoring may include a receiver and/or an antenna(s) 234 of the BS 102 illustrated in FIG. 2 and/or circuitry 1626 for monitoring of the communication device 1600 in FIG. 16.

Example Clauses

Implementation examples are described in the following numbered clauses:

Clause 1: A method for wireless communications performed by a UE, comprising detecting that a configured repetition pattern for uplink transmission to a network entity results in segmentation of at least one nominal repetition into multiple actual repetitions, modifying the configured repetition pattern, based at least in part on the detection, to avoid segmentation of nominal repetitions into multiple actual repetitions, and sending the uplink transmission to the network entity in accordance with the modified repetition pattern.

Clause 2: The method of Clause 1, wherein the uplink transmission comprises a physical uplink control channel (PUCCH) or physical uplink shared channel (PUSCH) transmission.

Clause 3: The method of Clause 1 or 2, wherein the modification of the configured repetition pattern results in replacing at least one of the multiple actual repetitions, resulting from segmentation due to the configured repetition pattern before modification, with an unsegmented nominal repetition.

Clause 4: The method of any of Clauses 1-3, wherein the modification of the configured repetition pattern results in maintaining at least one of the multiple actual repetitions, resulting from segmentation due to the configured repetition pattern before modification, and adding one or more nominal repetitions.

Clause 5: The method of Clause 4, wherein the number of nominal repetitions is designed to achieve a number of nominal repetitions corresponding to the configured repetition pattern.

Clause 6: The method of Clause 4 or 5, wherein at least one of the multiple actual repetitions is maintained only if a number of symbols of the actual repetitions is greater than a threshold value.

Clause 7: The method of Clause 6, further comprising receiving signaling indicating the threshold value.

Clause 8: The method of any of Clauses 1-7, wherein the modification of the configured repetition pattern is designed to add one or more nominal repetitions to achieve a number of nominal repetitions corresponding to the configured repetition pattern within a specified time period.

Clause 9: The method of Clause 8, further comprising receiving signaling indicating the specified time period.

Clause 10: The method of any of Clauses 1-9, further comprising receiving signaling indicating when the UE is expected to perform the detection and modification.

Clause 11: The method of any of Clauses 1-10, further comprising receiving signaling, from the network entity, indicating the UE can refrain from sending one or more of the repetitions, and refraining from sending one or more of the repetitions based on the signaling.

Clause 12: The method of Clause 11, wherein the signaling indicates successful receipt of the uplink transmission by the network entity.

Clause 13: The method of Clause 11 or 12, wherein the signaling comprise at least one of dedicated downlink control information (DCI) or group-common DCI to a group of UEs.

Clause 14: The method of any of Clauses 11-13, further comprising receiving an indication of an expected time to receive the signaling from the network entity.

Clause 15: The method of Clause 14, wherein the indication of the expected time is relative to a last uplink symbol configured via a DCI conveying the configured repetition pattern.

Clause 16: A method for wireless communications performed by a network entity, comprising configuring a UE with a repetition pattern for uplink transmission to the network entity that results in segmentation of at least one nominal repetition into multiple actual repetitions, and monitoring the uplink transmission from the UE in accordance with a modified repetition pattern, wherein the modified repetition pattern is a modified version of the configured repetition pattern such that the modified repetition pattern avoids segmentation of nominal repetitions into multiple actual repetitions.

Clause 17: The method of Clause 16, wherein the uplink transmission comprises a PUCCH or PUSCH transmission.

Clause 18: The method of Clause 16 or 17, wherein the modification of the configured repetition pattern results in replacing at least one of the multiple actual repetitions, resulting from segmentation due to the configured repetition pattern before modification, with an unsegmented nominal repetition.

Clause 19: The method of any of Clauses 16-18, wherein the modification of the configured repetition pattern results in maintaining at least one of the multiple actual repetitions, resulting from segmentation due to the configured repetition pattern before modification, and adding one or more nominal repetitions.

Clause 20: The method of Clause 19, wherein the number of nominal repetitions is designed to achieve a number of nominal repetitions corresponding to the configured repetition pattern.

Clause 21: The method of Clause 19 or 20, wherein at least one of the multiple actual repetitions is maintained only if a number of symbols of the actual repetitions is greater than a threshold value.

Clause 22: The method of Clause 21, further comprising transmitting signaling indicating the threshold value.

Clause 23: The method of any of Clauses 16-22, wherein the modification of the configured repetition pattern is designed to add one or more nominal repetitions to achieve a number of nominal repetitions corresponding to the configured repetition pattern within a specified time period.

Clause 24: The method of Clause 23, further comprising transmitting signaling indicating the specified time period.

Clause 25: The method of any of Clauses 16-24, further comprising transmitting signaling indicating when the UE is expected to perform a detection of the segmentation, and the modification of the configured repetition pattern.

Clause 26: The method of any of Clauses 16-25, further comprising transmitting signaling, to the UE, indicating that the UE can refrain from sending one or more of the repetitions, and refraining from monitoring one or more of the repetitions based on the signaling.

Clause 27: The method of Clause 26, wherein the signaling indicates successful receipt of the uplink transmission by the network entity.

Clause 28: The method of Clause 26 or 27, wherein the signaling comprise at least one of dedicated DCI or group-common DCI to a group of UEs.

Clause 29: The method of any of Clauses 26-28, further comprising transmitting, to the UE, an indication of an expected time when the UE is to receive the signaling from the network entity.

Clause 30: The method of Clause 29, wherein the indication of the expected time is relative to a last uplink symbol configured via a DCI conveying the configured repetition pattern.

Clause 31: A method for wireless communications performed by a network entity, comprising configuring a UE with a repetition pattern for uplink transmission to the network entity that results in segmentation of at least one nominal repetition into multiple actual repetitions, and monitoring the uplink transmission from the UE in accordance with a modified repetition pattern, wherein the modified repetition pattern is a modified version of the configured repetition pattern such that the modified repetition pattern avoids segmentation of nominal repetitions into multiple actual repetitions.

Clause 32: The method of Clause 31, wherein the uplink transmission comprises a PUCCH or PUSCH transmission.

Clause 33: The method of Clause 31 or 32, wherein the modification of the configured repetition pattern results in replacing at least one of the multiple actual repetitions, resulting from segmentation due to the configured repetition pattern before modification, with an unsegmented nominal repetition.

Clause 34: The method of any of Clauses 31-33, wherein the modification of the configured repetition pattern results in maintaining at least one of the multiple actual repetitions, resulting from segmentation due to the configured repetition pattern before modification, and adding one or more nominal repetitions.

Clause 35: The method of Clause 34, wherein the number of nominal repetitions is designed to achieve a number of nominal repetitions corresponding to the configured repetition pattern.

Clause 36: The method of Clause 34 or 35, wherein at least one of the multiple actual repetitions is maintained only if a number of symbols of the actual repetitions is greater than a threshold value.

Clause 37: The method of Clause 36, further comprising transmitting signaling indicating the threshold value.

Clause 38: The method of any of Clauses 31-37, wherein the modification of the configured repetition pattern is designed to add one or more nominal repetitions to achieve a number of nominal repetitions corresponding to the configured repetition pattern within a specified time period.

Clause 39: The method of Clause 38, further comprising transmitting signaling indicating the specified time period.

Clause 40: The method of any of Clauses 31-39, further comprising transmitting signaling indicating when the UE is expected to perform a detection of the segmentation, and the modification of the configured repetition pattern.

Clause 41: The method of any of Clauses 31-39, further comprising transmitting signaling, to the UE, indicating that the UE can refrain from sending one or more of the repetitions, and refraining from monitoring one or more of the repetitions based on the signaling.

Clause 42: The method of Clause 41, wherein the signaling indicates successful receipt of the uplink transmission by the network entity.

Clause 43: The method of Clause 41 or 42, wherein the signaling comprise at least one of dedicated DCI or group-common DCI to a group of UEs.

Clause 44: The method of any of Clauses 41-43, further comprising transmitting, to the UE, an indication of an expected time when the UE is to receive the signaling from the network entity.

Clause 45: The method of Clause 44, wherein the indication of the expected time is relative to a last uplink symbol configured via a DCI conveying the configured repetition pattern.

Clause 46: An apparatus, comprising: a memory comprising computer-executable instructions and one or more processors configured to execute the computer-executable instructions and cause the one or more processors to perform a method in accordance with any one of Claims 1-45.

Clause 47: An apparatus, comprising means for performing a method in accordance with any one of Claims 1-45.

Clause 48: A non-transitory computer-readable medium comprising computer-executable instructions that, when executed by one or more processors, cause the one or more processors to perform a method in accordance with any one of Claims 1-45.

Clause 49: A computer program product embodied on a computer-readable storage medium comprising code for performing a method in accordance with any one of Claims 1-45.

Additional Wireless Communication Network Considerations

The techniques and methods described herein may be used for various wireless communications networks (or wireless wide area network (W WAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmW), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with core network 190 through second backhaul links 184. Base stations 102 may communicate directly or indirectly (e.g., through the EPC 160 or core network 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

Core network 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and core network 190. Generally, AMF 192 provides QoS flow and session management.

All user Internet protocol (IP) packets are transferred through UPF 195, which is connected to the IP Services 197, and which provides UE IP address allocation as well as other functions for core network 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

Antennas 252, processors 266, 258, 264, and/or controller/processor 280 of UE 104 and/or antennas 234, processors 220, 230, 238, and/or controller/processor 240 of BS 102 may be used to perform the various techniques and methods described herein.

For example, as shown in FIG. 2, the controller/processor 240 of the BS 102 has repetition pattern configuration component 241 that may be configured to perform the operations shown in FIG. 8, as well as other operations described herein for replacing/fixing broken uplink repetitions. As shown in FIG. 2, the controller/processor 280 of the UE 104 has a repetition pattern configuration component 281 that may be configured to perform the operations shown in FIG. 7, as well as other operations described herein for replacing/fixing broken uplink repetitions. Although shown at the controller/processor, other components of UE 104 and BS 102 may be used to perform the operations described herein.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of replacing and/or fixing broken uplink repetitions due to segmentation of nominal repetitions into actual repetitions. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor).

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7 and FIG. 8, as well as other operations described herein for replacing/fixing broken uplink repetitions.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated herein. Various modifications, changes and variations may be made in the arrangement, operation, and details of the methods and apparatus described herein.

The invention claimed is:

1. A method for wireless communications performed by a user equipment (UE), comprising:
   detecting that a configured repetition pattern for uplink transmission to a network entity results in segmentation of at least one nominal repetition into multiple actual repetitions;
   modifying the configured repetition pattern, based at least in part on the detection, to avoid segmentation of nominal repetitions into multiple actual repetitions; and
   sending the uplink transmission to the network entity in accordance with the modified repetition pattern.

2. The method of claim 1, wherein the uplink transmission comprises a physical uplink control channel (PUCCH) or a physical uplink shared channel (PUSCH) transmission.

3. The method of claim 1, wherein modifying the configured repetition pattern comprises replacing at least one of the multiple actual repetitions that resulted from segmentation due to the configured repetition pattern before modification with an unsegmented nominal repetition.

4. The method of claim 1, wherein modifying the configured repetition pattern comprises:
   maintaining at least one of the multiple actual repetitions that resulted from segmentation due to the configured repetition pattern before modification; and
   adding one or more nominal repetitions.

5. The method of claim 4, wherein the number of nominal repetitions corresponds to the configured repetition pattern.

6. The method of claim 4, wherein maintaining the at least one of the multiple actual repetitions comprises maintaining the at least one of the multiple actual repetitions when a number of symbols of the actual repetitions is greater than a threshold value.

7. The method of claim 6, further comprising receiving signaling indicating the threshold value.

8. The method of claim 1, wherein modifying the configured repetition pattern comprises adding one or more nominal repetitions to achieve a number of nominal repetitions corresponding to the configured repetition pattern within a specified time period.

9. The method of claim 8, further comprising receiving signaling indicating the specified time period.

10. The method of claim 1, further comprising receiving signaling indicating a time at which the detection and modification is expected to be performed.

11. The method of claim 1, further comprising:
   receiving signaling, from the network entity, indicating that sending one or more of the repetitions is unnecessary; and
   refraining from sending one or more of the repetitions based on the signaling.

12. The method of claim 11, wherein the signaling indicates successful receipt of the uplink transmission by the network entity.

13. The method of claim 11, wherein the signaling comprise at least one of dedicated downlink control information (DCI) or group-common DCI to a group of UEs.

14. The method of claim 11, further comprising receiving an indication of an expected time to receive the signaling from the network entity.

15. The method of claim 14, wherein the indication of the expected time is relative to a last uplink symbol configured via a downlink control information (DCI) conveying the configured repetition pattern.

16. An apparatus for wireless communications, comprising:
   a memory; and
   at least one processor coupled to the memory, wherein the at least one processor is configured to:
      detect that a configured repetition pattern for uplink transmission to a network entity results in segmentation of at least one nominal repetition into multiple actual repetitions;
      modify the configured repetition pattern, based at least in part on the detection, to avoid segmentation of nominal repetitions into multiple actual repetitions; and
      send the uplink transmission to the network entity in accordance with the modified repetition pattern.

17. The apparatus of claim 16, wherein the uplink transmission comprises a physical uplink control channel (PUCCH) or a physical uplink shared channel (PUSCH) transmission.

18. The apparatus of claim 16, wherein to modify the configured repetition pattern, the at least one processor is configured to replace at least one of the multiple actual repetitions that resulted from segmentation due to the configured repetition pattern before modification with an unsegmented nominal repetition.

19. The apparatus of claim 16, wherein to modify the configured repetition pattern, the at least one processors is configured to:
   maintain at least one of the multiple actual repetitions that resulted from segmentation due to the configured repetition pattern before modification; and
   add one or more nominal repetitions.

20. The apparatus of claim 19, wherein the number of nominal repetitions corresponds to the configured repetition pattern.

21. The apparatus of claim 19, wherein the at least one processor is configured to maintain the at least one of the multiple actual repetitions when a number of symbols of the actual repetitions is greater than a threshold value.

22. The apparatus of claim 21, wherein the at least one processor is configured to receive signaling indicating the threshold value.

23. The apparatus of claim 16, wherein to modify the configured repetition pattern, the at least one processor is configured to add one or more nominal repetitions to achieve a number of nominal repetitions corresponding to the configured repetition pattern within a specified time period.

24. The apparatus of claim 23, wherein the at least one processor is configured to receive signaling indicating the specified time period.

25. The apparatus of claim 16, wherein the at least one processor is configured to receive signaling indicating a time at which the at least one processor is expected to perform the detection and modification.

26. The apparatus of claim 16, wherein the at least one processor is configured to:
   receive signaling, from the network entity, indicating that the at least one processor can refrain from sending one or more of the repetitions; and
   refrain from sending one or more of the repetitions based on the signaling.

27. The apparatus of claim 26, wherein the signaling indicates successful receipt of the uplink transmission by the network entity.

28. The apparatus of claim 26, wherein the signaling comprise at least one of dedicated downlink control information (DCI) or group-common DCI to a group of UEs.

29. An apparatus for wireless communications, comprising:
- means for detecting that a configured repetition pattern for uplink transmission to a network entity results in segmentation of at least one nominal repetition into multiple actual repetitions;
- means for modifying the configured repetition pattern, based at least in part on the detection, to avoid segmentation of nominal repetitions into multiple actual repetitions; and
- means for sending the uplink transmission to the network entity in accordance with the modified repetition pattern.

30. A non-transitory computer readable medium having instructions stored thereon that, when executed, cause an apparatus to:
- detect that a configured repetition pattern for uplink transmission to a network entity results in segmentation of at least one nominal repetition into multiple actual repetitions;
- modify the configured repetition pattern, based at least in part on the detection, to avoid segmentation of nominal repetitions into multiple actual repetitions; and
- send the uplink transmission to the network entity in accordance with the modified repetition pattern.

* * * * *